United States Patent [19]
Xu et al.

[11] Patent Number: 6,025,413
[45] Date of Patent: *Feb. 15, 2000

[54] WATER-BASED CORRECTION FLUID

[75] Inventors: Yun Xu, Quincy; Brian K. McHugh, Harvard; Kim H. Ng, Franklin, all of Mass.

[73] Assignee: The Gillette Company, Boston, Mass.

[*] Notice: This patent is subject to a terminal disclaimer.

[21] Appl. No.: 09/145,584

[22] Filed: Sep. 2, 1998

Related U.S. Application Data

[63] Continuation of application No. 08/717,289, Sep. 20, 1996, Pat. No. 5,877,234, which is a continuation-in-part of application No. 08/378,618, Jan. 26, 1995, abandoned, which is a continuation-in-part of application No. 08/331,886, Oct. 31, 1994, abandoned.

[51] Int. Cl.$^7$ .............................. C09D 10/00; C08K 7/00; C08K 3/34
[52] U.S. Cl. ............................................. 523/161; 524/456
[58] Field of Search ..................... 523/160, 161; 106/31.32, 31.64; 524/456

[56] References Cited

U.S. PATENT DOCUMENTS

| | | |
|---|---|---|
| 2,361,515 | 10/1944 | Weidlich . |
| 3,674,729 | 7/1972 | Mirick . |
| 3,897,375 | 7/1975 | Takahashi et al. . |
| 3,956,008 | 5/1976 | Knepper et al. . |
| 3,970,629 | 7/1976 | Izaki et al. . |
| 4,036,663 | 7/1977 | Williams et al. . |
| 4,069,186 | 1/1978 | Ramig . |
| 4,111,878 | 9/1978 | Ruhf . |
| 4,148,944 | 4/1979 | Ruhf . |
| 4,165,988 | 8/1979 | Page et al. ............................ 106/31.93 |
| 4,225,496 | 9/1980 | Columbus et al. . |
| 4,283,320 | 8/1981 | Carroll et al. . |
| 4,367,171 | 1/1983 | Leifels et al. . |
| 4,400,441 | 8/1983 | Minnis et al. . |
| 4,436,789 | 3/1984 | Davis et al. . |
| 4,456,507 | 6/1984 | Kivel et al. . |
| 4,687,789 | 8/1987 | Gonnet et al. . |
| 4,775,420 | 10/1988 | Gonnet et al. . |
| 4,800,107 | 1/1989 | Wickert .................................. 427/421 |
| 4,992,502 | 2/1991 | Loftin et al. ............................ 524/277 |
| 5,199,976 | 4/1993 | Yau et al. ............................... 523/161 |
| 5,256,703 | 10/1993 | Hermann et al. . |
| 5,332,599 | 7/1994 | Sanborn . |
| 5,338,775 | 8/1994 | Matz et al. . |
| 5,370,922 | 12/1994 | Sanborn et al. . |
| 5,403,872 | 4/1995 | Koreska ................................. 523/161 |
| 5,464,883 | 11/1995 | Sharma et al. . |
| 5,480,920 | 1/1996 | Sharma et al. ........................ 523/161 |
| 5,877,234 | 3/1999 | Xu et al. ................................ 523/161 |

FOREIGN PATENT DOCUMENTS

| | | |
|---|---|---|
| A1-60131/80 | 4/1980 | Australia . |
| 47-33055 | 8/1972 | Japan . |
| 58-156097 | 9/1983 | Japan . |
| 2-185577 | 7/1990 | Japan . |
| 3-183136 | 1/1993 | Japan . |
| 1385810 | 2/1975 | United Kingdom . |
| 2 058 110 | 4/1981 | United Kingdom . |
| WO 92/07039 | 4/1992 | WIPO . |
| WO 94/29393 | 12/1994 | WIPO . |

OTHER PUBLICATIONS

Lewis, Peter A., Editor; Pigment Handbook vol. 1, John Wiley and Sons, New York (pp. 197–208), 1988.
Morgans, W.M; Outlins of Paint Technology, John Wiley and Sons, New York (p. 274), 1982.
NYCO, "Benefits of 10 Wollastokup" brochure (1990).
UCAR, "UCAR Latex 100 for Water–Based Clear Caulks and Sealants" brochure (1987).
Henkel, "Nopcosperse 44 Pigment Dispersant" Data Sheet ARC–102 (1991).
Henkel, "Nopco 8034 Defoamer for Synthetic Latex Systems" Data Sheet ARC–143 (Oct., 1992).
Rohm and Haas Company, "Experimental Emulsion E–726" [PR–26] brochure (Oct., 1991).
Robinson, "Calcium Metasilicate—WoLlastonite—Unique FunctionAl Extender for Anti–Corrosion, High Solids and Water–Borne Coatings", *Polymeric Materials Science & Engineering*, 70:175–76 (1994).

*Primary Examiner*—Vasu Jagannathan
*Assistant Examiner*—Callie E. Shosho
*Attorney, Agent, or Firm*—Fish & Richardson P.C.

[57] ABSTRACT

The invention features a water-based correction fluid that includes an opacifying pigment, water, and a film-forming system that provides the correction fluid with a writeover time of about 40 seconds or less.

20 Claims, 9 Drawing Sheets

WATER-BASED CORRECTION FLUID

RELATED APPLICATION

This application is a continuation of Ser. No. 08/717,289, filed Sep. 20, 1996, now U.S. Pat. No. 5,877,234, which in turn is a continuation-in-part of U.S. Ser. No. 08/378,618, filed Jan. 26, 1995, abandoned, which in turn is a continuation-in-part of U.S. Ser. No. 08/331,886, filed Oct. 31, 1994, abandoned.

FIELD OF THE INVENTION

The invention relates to correction fluids.

BACKGROUND OF THE INVENTION

Correction fluids are used for correcting handwritten, typewritten, photocopied, or laser printed markings on paper. Generally, correction fluids are applied to a paper surface over an erroneous marking in liquid form. The fluid subsequently forms a film which effectively covers erroneous markings on the surface and can receive a correct marking. Making a corrective marking over the film commonly is known as "writeover".

Correction fluids typically include some standard ingredients, including an opacifying pigment (commonly titanium dioxide), a film-forming polymeric material, and a solvent. The opacifying pigment is dispersed in the fluid and provides the basic white color which can be toned with other pigments to provide a correction fluid closely corresponding to the color of the paper to which the fluid is to be applied. The opacifying pigment functions to obscure the erroneous marking over which the correction fluid is applied. The film-forming polymeric material, also known as the binder, binds the pigment to the paper and helps to form a flexible but continuous covering that remains once the solvent has dried.

The solvent is used as the carrier for the other ingredients in the fluid. The solvent can be either a volatile organic or water. Volatile organic solvents have the advantage of evaporating quickly and as a result correction fluids based on volatile organic solvents often are ready to receive a corrective marking 15–20 seconds after application. In contrast, commercial water-based correction fluids typically are not ready to receive a corrective marking until about 90 seconds after application. But water-based correction fluids generally are better for the environment and safer than correction fluids including volatile organic solvents.

SUMMARY OF THE INVENTION

Generally, the invention relates to water-based correction fluids that have low writeover times, preferably less than 40 seconds, and more preferably less than 30 seconds. The water-based correction fluids thus have a key benefit (low writeover time) associated with organic solvent-based correction fluids, but also have the safety and environmental benefits associated with water-based correction fluids. The writeover times of a correction fluid can be tested using either Writeover Test No. 1 or Writeover Test No. 2, both of which will be described subsequently.

Three aspects of the invention concern specific features that contribute to reducing the writeover time of water-based correction fluids.

The first aspect of the invention features a water-based correction fluid including acicular particles. Acicular particles are needle-like particles that have an aspect (length:width) ratio of higher than 1:1. The preferred acicular particles have an aspect ratio of between about 5:1 and 10:1, and are less than about 0.1 mm in length. Particularly preferred acicular particles are composed of wallastonite (calcium metasilicate), which is a naturally occurring mineral. A preferred correction fluid includes between 45% and 60% of opacifying pigment by weight, between 12% and 16% of film-forming polymer by weight, between 1% and 9% of the acicular particles by weight, and between 20% and 40% (more preferably between 28% and 31%) of water by weight.

The second aspect of the invention features a water-based correction fluid including a film-forming polymer having a glass transition temperature of less than 17° C. and a film-forming polymer having a glass transition temperature of between 10° C. and 30° C. The correction fluid optionally may include only one film-forming polymer if the polymer has a glass transition temperature of between 10° C. and 17° C. Preferably, however, the correction fluid includes at least two film-forming polymers, one having a glass transition temperature of less than 12° C., the other having a glass transition temperature of between 15° C. and 30° C. A preferred correction fluid includes between 45% and 60% of opacifying pigment by weight, between 3% and 14% of the film-forming polymer having a glass transition temperature of less than 17° C. by weight, between 3% and 14% of the film-forming polymer having a glass transition temperature between 10° C. and 30° C. by weight, and between 20% and 40% (and more preferably between 28% and 31%) of water by weight. The preferred correction fluid also includes acicular particles.

The third aspect of the invention features a correction fluid having a total pigment:film-forming polymer ratio between about 3:1 and about 5:1. One preferred embodiment also includes the acicular particles. Another preferred embodiment includes a film-forming polymer having a glass transition temperature of less than 17° C. and a film-forming polymer having a glass transition temperature of between 10° C. and 30° C.

Each of the featured correction fluids preferably has a viscosity of between about 100 cps and 1500 cps (as measured on a Brookfield Viscometer), and more preferably between about 300 cps and 600 cps. In addition, each of the featured correction fluids has a total solids content of at least 60%; more preferred correction fluids have a total solids content of at least 65%. Finally, each of the preferred correction fluids includes a dispersing agent and a surfactant.

A fourth aspect of the invention concerns the manner in which the acicular particles, the film-forming polymers, and the pigment:film-forming binder ratio affect the writeover time of water-based correction fluids. Acicular particles and film-forming polymers having a relatively high glass transition temperature increase the strength of the film that is formed on the substrate. As a result, the writeover time of the correction fluid is reduced. Lowering the pigment:film-forming polymer weight ratio and including the acicular particles and a film-forming polymer with a low glass transition temperature increase the rate at which the film will form after the correction fluid is applied over an erroneous marking, thus also reducing the writeover time of the correction fluid. Without being bound to any theory, it is believed that the acicular particles, particularly, help form a strong composite matrix quickly on the surface of the fluid applied over an erroneous marking.

Thus, the writeover time of a water-based correction fluid can be substantially reduced by selecting the appropriate components (and quantities of the components) that are part of the film-forming system. Accordingly, the fourth aspect of the invention features a water-based correction fluid including a film-forming system that provides the correction fluid with a writeover time of less than 40 seconds. The film-forming system preferably includes acicular particles, a film-forming polymer having a glass transition temperature of less than about 17° C., and a film-forming polymer having a glass transition temperature of between about 10° C. and 30° C. A sufficient quantity of film-forming polymer is included in the system to provide the correction fluid with a pigment:film-forming polymer ratio of equal to or less than about 5:1. The acicular particles are considered a pigment for the purposes of determining the pigment:film-forming polymer ratio.

A fifth aspect of the invention is applying any of the featured correction fluids to a substrate to cover an erroneous marking. A corrective marking optionally subsequently is applied.

The disclosure in U.S. Ser. No. 08/240,159, filed May 10, 1994, which is assigned to the same assignee as the present application, is incorporated by reference.

As mentioned previously, the correction fluids of the invention have relatively low writeover times and good environmental properties. Additionally, the correction fluids provide good coverage, have good bleed resistance (even with ball pen inks), generally have good wetting properties on paper surfaces, and have good dispersion properties. Moreover, the correction fluids provide corrective films that are strong but flexible. Finally, the preferred correction fluids have a sufficiently low viscosity that they can be applied with a conventional brush applicator.

Other features and advantages of the invention will be apparent from the Description of the Preferred Embodiments thereof, and from the claims.

DESCRIPTION OF THE PREFERRED EMBODIMENTS

Figure 1:
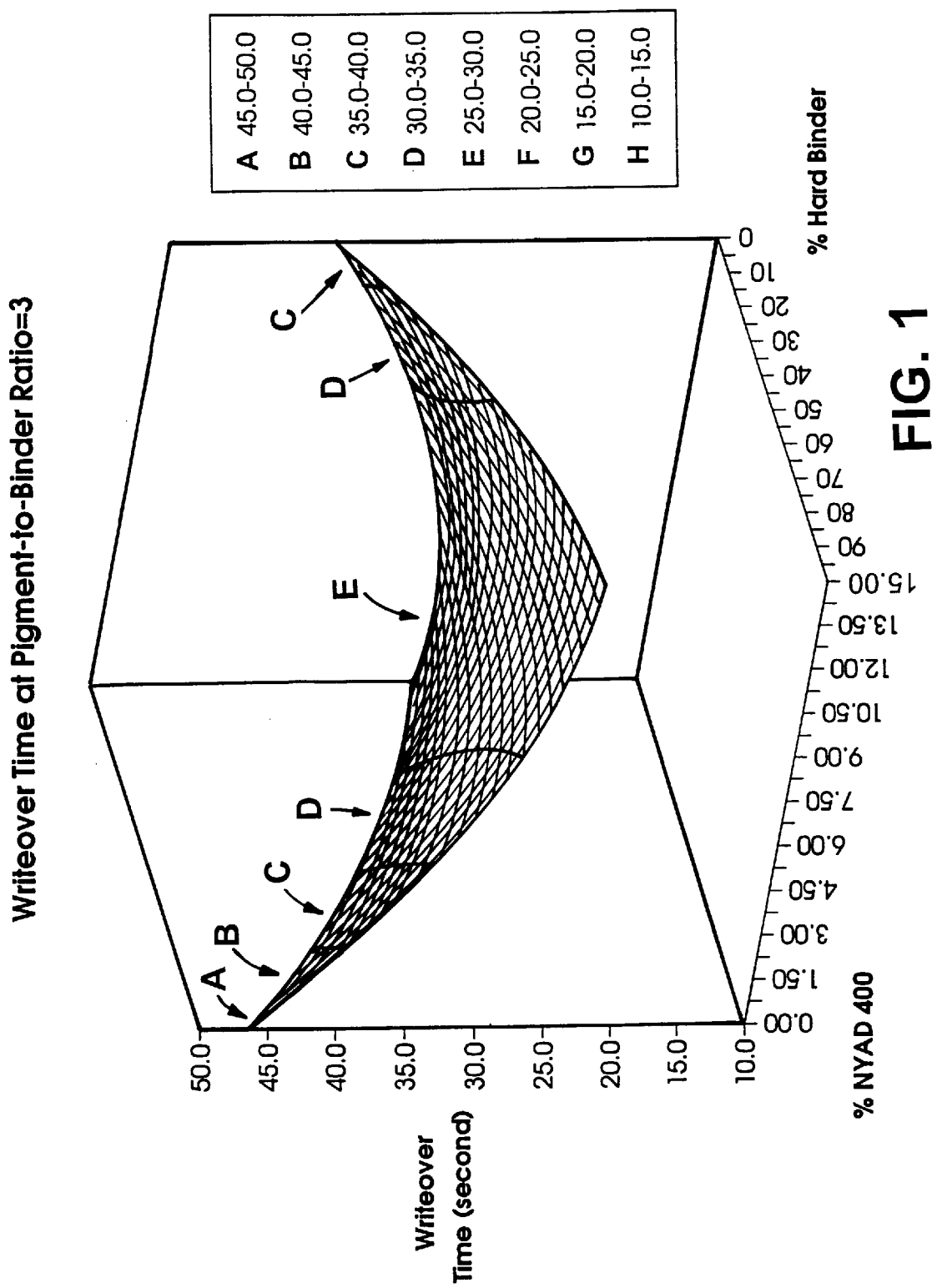
FIGS. 1–3 are graphs which provide the predicted writeover times of aqueous correction fluids at specific pigment:film-forming polymer ratios at varied acicular particle and hard film-forming polymer concentrations.

The preferred correction fluid includes water, an opacifying pigment, acicular particles, a film-forming polymer having a glass transition temperature of less than about 12° C., a film-forming polymer having a glass transition temperature of between about 15° C. and about 30° C., a cationic non-film-forming polymer, a dispersing agent, and a surfactant. The preferred correction fluid optionally may also include extender pigments, other pigments to color match the fluid to match recycled white paper, a biocide, and a defoaming agent. The preferred correction fluid has a solids content of at least 65% and has a pigment:film-forming polymer ratio of between 3:1 and 5:1. The correction fluids preferably have a pH of between 4 and 11, more preferably between 7.5 and 10.

Any suitable opacifying pigment having adequate hiding power to cover ink markings may be utilized as the primary pigment in the correction fluids. However, the pigment preferably has an average particle size of less than 0.8 micrometer (to increase dispersibility), and has been treated with alumina or a combination of alumina and silica to increase dispersibility. Titanium dioxide is the most preferred opacifying pigment, as it provides for maximum hiding and is a white pigment which can be toned to match a variety of bright paper stock colors. Suitable titanium dioxide pigments include commercially available rutile titanium dioxides and anatase titanium dioxides, or blends or mixtures of these which preferably have an average particle size between approximately 0.2 micron to 0.4 micron and an average oil absorption of about 16 g/100 g pigment.

The preferred titanium dioxide is Ti-Pure® R-900 (DuPont, Wilmington, Del.), which is a rutile titanium dioxide composition manufactured by the chloride process. This composition includes about 94% $TiO_2$, and 4.5% alumina. The particle size varies, but 80% of the particles are 0.4 micron or smaller, and 90% of the particles are under 0.6 micron. The pH of Ti-Pure® R-900 in an aqueous suspension is approximately 8.2.

Other suitable titanium dioxide compositions include Ti-Pure® R-901, Ti-Pure® R-902; Ti-Pure® 931, Tioxide R-XL (Tioxide America, Inc., Columbia, Md.) and Kronos 2131 (Kronos, Inc., Houston, Tex.). Other opacifying pigments may be used, either alone, but preferably in combination with the titanium dioxide. Such pigments include zinc sulfide and zinc oxide.

Sufficient titanium dioxide should be included so that a mark on paper is not visible after curing, but not so much that it interferes with the formation of a solid film or raises the pigment:film-forming polymer weight ratio above about 4:1. Preferably, the correction fluid should include 45% to 60%, and more preferably 47% to 53%, of the pigment by weight.

The film-forming polymer having a glass transition temperature of less than 12° C. is soft and hastens the formation of a coalesced film after application. The more preferred soft film-forming polymers have a glass transition temperature of less than 10° C. Film-forming polymers having a glass transition temperature of less than 12° C. include styrene-acrylic copolymers, styrene-methacrylic copolymers, ethylene-vinyl acetate copolymers, vinyl acrylics, acrylics. Specific examples include UCAR® Latex 446 (Union Carbide, Cary, N.C., Tg=9° C.), UCAR® 100, 76 RES 4170, Airflex 426, UCAR® 354, and UCAR® 415. UCAR® Latex 446 is a particularly preferred film-forming polymer with a low glass transition temperature. It is a latex emulsion including synthetic acrylate/styrene polymers that is non-ionically stabilized. UCAR® 446 Latex includes about 38% water and 62% copolymer of methyl methacrylate, butyl acrylate, styrene, methacrylic acid, and 2-hydroxyethyl acrylate. It also includes about 0.03% formaldehyde and 0.02% ammonia.

The correction fluid should include an amount of a film-forming polymer having a glass transition temperature of less than 12° C. that is effective to increase the rate of film formation without unduly decreasing the strength of the film that is formed. The preferred correction fluids include between about 3% and about 12% (more preferably between about 6% and about 9%) of the film-forming polymer having a glass transition temperature of less than 12° C. by weight.

The film forming polymer having a glass transition temperature of between 15° C. and 30° C. is included in the correction fluid to increase the hardness (strength) of the film that is formed. The glass transition temperature of the film-forming polymer preferably is not greater than 30° C. because the polymer may then adversely impact film formation. The film-forming polymer can be styrene acrylic copolymers, styrene-methacrylic copolymers, ethylene-vinyl acetate copolymers, vinyl acrylics, acrylics. Examples include UCAR® Latex 144 (Union Carbide) (Tg=20° C.), UCAR® 503, UCAR® 422, and UCAR® 518. UCAR® Latex 144 is particularly preferred. UCAR® 144 includes about 52% water and 48% copolymer of butylacrylate, styrene, methacrylic acid. It also includes about 0.1% ammonia.

The correction fluid should include an amount of a film forming polymer having a glass transition temperature of between about 15° C. and about 30° C. that is effective in increasing the hardness of the film without unduly decreasing the rate of film formation. Film-forming polymers having glass transition temperatures within this range typically are significantly harder than film-forming polymers having a lower glass transition temperature and as a result tend not to coalesce as quickly. The quantity of film-forming polymer having a glass transition temperature of between 15° C. and about 30° C. relative to the quantity of film-forming polymer having a glass transition temperature less than 12° C. should be that which provides the best combination of rate of film formation and film strength.

The preferred correction fluids include between about 3% and about 12% (more preferably between about 6% and about 8%) of the film-forming polymer having a glass transition temperature-of between 15° C. and 30° C. by weight. The preferred weight ratio (on a dry basis) of film-forming polymer (Tg between 15° C. and 30° C.) to film-forming polymer (glass transition temperature less than 12° C.) is between about 70:30 and about 20:80, and more preferably between about 40:60 and about 60:40.

The overall ratio of pigment (opacifying pigment, extender pigments, etc.) to film-forming polymer also affects the rate of film formation. The smaller the ratio, the more film-forming polymer present, and the faster the film will form. But too little pigment, in particular the opacifying pigment, may result in insufficient coverage of the underlying erroneous marking. Preferably the correction fluids include a pigment:film-forming polymer ratio of between about 5:1 and about 3:1, and more preferably between about 4:1 and about 3.7:1.

The cationic non-film-forming polymer inhibits bleeding of the underlying ink marking, particularly when the ink marking includes a water soluble dye, as is typically present in ball pen ink. The preferred cationic non-film-forming polymers are acrylics; a particularly preferred polymer is Rhoplex® PR-26 (Rohm & Haas, Philadelphia). Enough of the cationic non-film-forming polymer is used to achieve the desired non-bleed properties of the correction fluid. Preferably, the correction fluid should include about 0.5% to 5.0%, and more preferably 0.8% to 1.2%, of the cationic non-film-forming polymer by weight.

The acicular particles increase the hardness of the film that is formed and, importantly, increase the rate of film formation. The preferred acicular particles are less than about 0.1 mm in length, and have an aspect ratio of between about 15:1 and about 2:1, and more preferably have an aspect ratio of between about 5:1 and about 10:1. Particularly preferred acicular particles-are composed of calcium metasilicate and are sold under the tradename NYAD 400 (NYCO Minerals, Inc., Willsboro, N.Y.).

The preferred correction fluid includes a sufficient quantity of acicular particles to meaningfully increase the rate of film formation and strength of the film, and to reduce the viscosity of the film, but not so much that the obscuring power of the fluid or flexibility of the film are significantly decreased. Preferably the correction fluid includes between about 0.5% and about 9% (more preferably between about 1% and about 5%) of the acicular particles by weight.

The preferred pigment dispersants are sodium salts of carboxylate polyelectrolytes such as Nopcosperse® 44 (Henkel Corp., Ambler, Pa.), or preferably sodium salts of maleic anhydride copolymers, e.g., TAMOL® 731 SD (Rohm & Haas, Philadelphia, Pa.), or sodium salts of poly-methacrylic acid. Such a dispersant should be added in a sufficient amount to ensure complete dispersion of the high quantity of pigment in the correction fluid at low viscosity and with little or no foam generation. Other suitable polyelectrolytic acrylate dispersants include TAMOL® 850, or 960. Preferably, the correction fluid includes 0.5% to 1.5%, and more preferably 0.8% to 1.1%, of the dispersant by weight.

The surfactant serves as a wetting agent. Any suitable surfactant can be used. Preferred surfactants are nonionic and include acetylenic diols and alcohols such as Surfynol® 104 (Air Products and Chemicals, Inc., Allentown, Pa.) which is 2,4,7,9-tetramethyl-5-decyne-4,7-diol. Preferably, the correction fluid includes about 0.3% to about 2.0%, and more preferably 0.45% to 1.5%, of the surfactant by weight.

Preferred extender pigments include kaolin ("China") clay, such as Kaopaque® 10-S (Dry Branch Kaolin Co, Dry Branch, Ga.), which includes greater than 97% kaolin clay ($Al_2O_3.2SiO_2.2H_2O$), less than 3% water, and 0.35% of a sodium polyacrylate/soda ash dispersant. Other suitable kaolin clays are McNamee Clay (R.T. Vanderbilt, Inc., Norwalk, Conn.) and Huber 40° C. (J.M. Huber Corp., Macon, Ga.). The extender pigment is added in an amount that enhances the ability to write with ball-point pen ink over the corrected spot. Preferably, the correction fluid should includes 5% to 15%, and more preferably 5% to 10%, of the extender pigment by weight.

To color match, e.g., lined notebook paper, the titanium dioxide primary pigment can be tinted with other pigments, such as black, burnt umber, and blue, using standard color matching techniques. The preferred black pigment is an aqueous dispersible carbon black such as Mars Black. A preferred Burnt Umber pigment is Burnt Umber W-3247, Aurasperse® Engelhard Chemical, N.J.). These colorants are used in amounts to color match the shade of white of the paper on which the correction fluid is to be used. Of course, colored correction fluid for colored paper can also be made. Preferably, the correction fluid should include less than 2.0% of the colorant pigments by weight.

The biocide is used to prevent bacteria from contaminating the correction fluid. Bacteria attack some polymers, and are often found dormant in some of the ingredients, e.g., pigments, used to manufacture correction fluids. A sufficient amount to prevent bacterial growth should be used. Preferably the correction fluid includes about 0.05% to 1.0% of the biocide by weight.

The preferred defoaming agent is Nopco® 8034 (Henkel Corp., Ambler, Pa.), although any defoaming agent typically used in correction fluids can be used. Such defoaming agents are usually mineral oil derivatives mixed with amorphous silica, and should be added in an amount sufficient to ensure that the correction fluid is deaerated and does not foam when shaken. Preferably, the correction fluid includes 0.05% to 1.0%, and more preferably 0.21% to 0.4%, of the defoaming agent by weight.

The preferred correction fluids should have a writeover time of less than about 35 seconds. More preferred correction fluids have a writeover time of less than about 20 seconds. To determine writeover time in accordance with the invention, the following procedure can be used. The test will be referred to in the application and claims as "Writeover Test No. 1.1"

1. Prepare a bottle of each fluid to be tested and shake well before using.
2. Make a mark (e.g., draw a zigzag curve or write a word) on a sheet of blank paper using a ball pen.
3. Immerse a correction fluid brush into the fluid and wipe the brush on the neck of the bottle twice.
4. Apply the fluid over the mark.
5. Use a stop watch. Write the letter B over the applied fluid 12 seconds after application of the fluid using a medium point ball pen (e.g., BIC Blue).
6. Examine the corrected marking to determine if the marking is free of voids.
7. Repeat steps 2–6 nineteen addition times. When necessary, clean the ball point tip before proceeding to the next test.
8. If 80% (or above) of the correction markings (e.g., 16 or more of the 20 procedures) are free of voids, record the time (12 seconds) as the writeover time.
9. If less than 80% of the correction markings are free of voids, repeat steps 2–7 but increase the time of step 5 by two seconds until 80% or above of the corrected markings made at the same time are free of voids and record that time as the writeover time.

Writeover Test No. 1 is carried out at room temperature and at a humidity level of between 25% and 35%.

Figure 2:
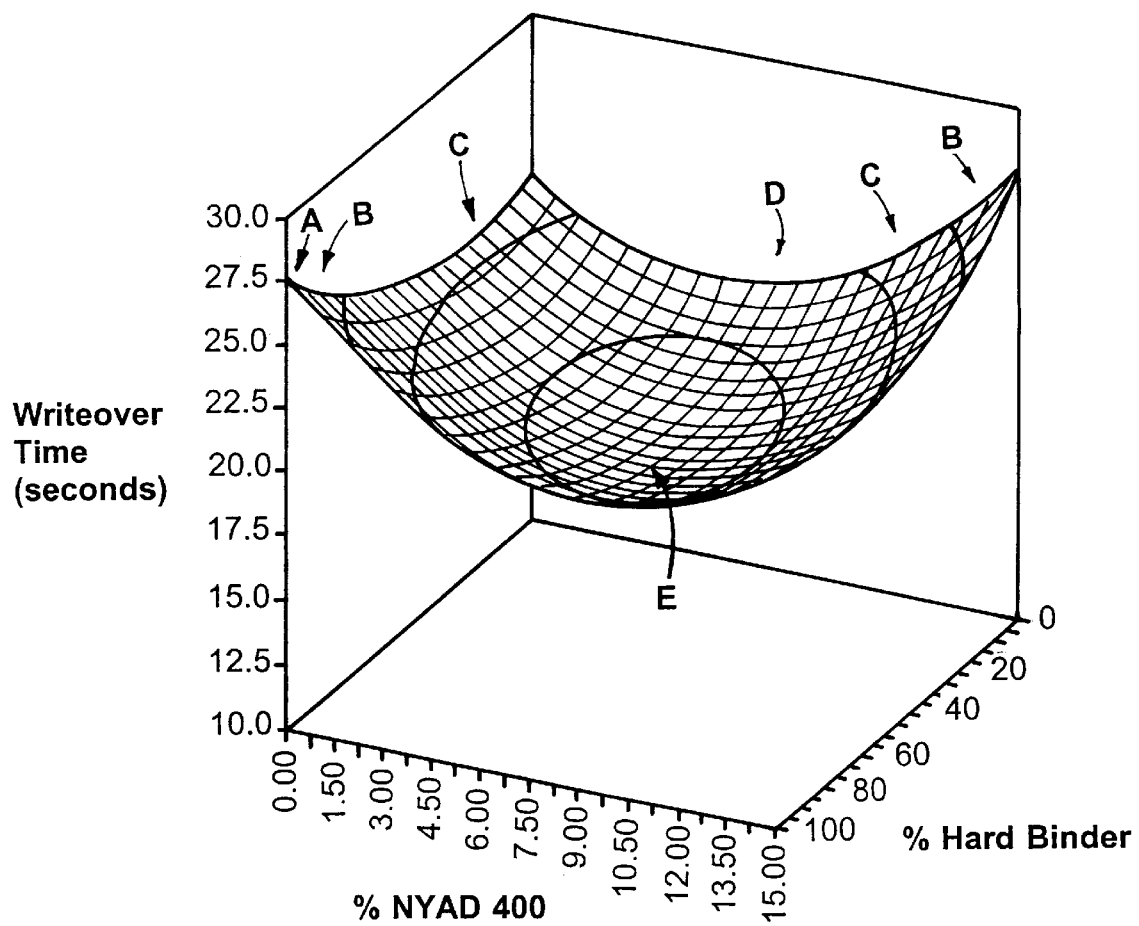
Figure 3:
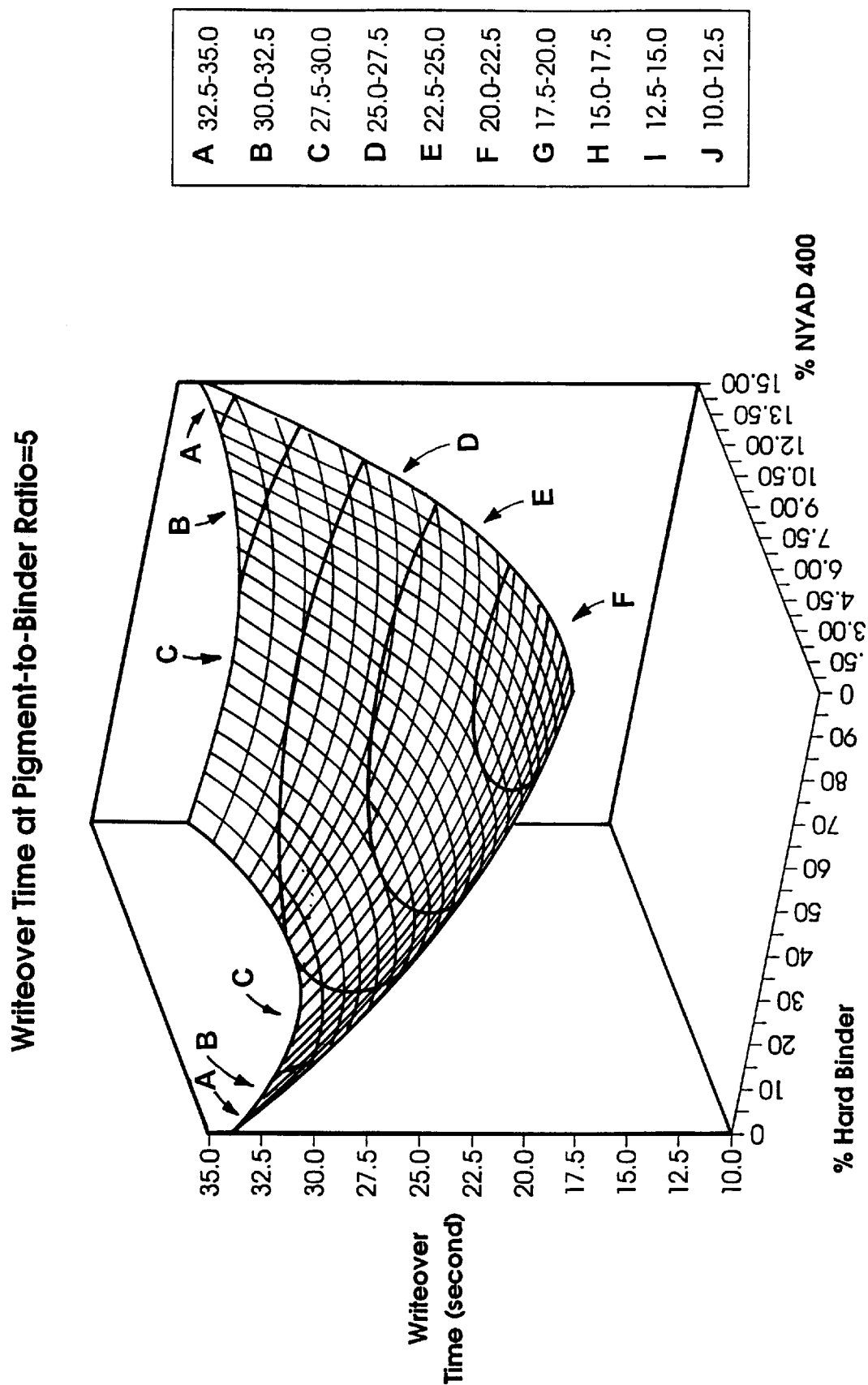

The writeover time of aqueous correction fluids depend in significant part on the components and quantity of components of the film-forming system. Referring to FIGS. 1–3, the predicted writeover times of aqueous correction fluids at specific pigment:binder (film-forming polymer) ratios are plotted on a three-dimensional graph against the percent acicular particles (specifically NYAD 400) in the pigment and the percent hard film-forming polymer (specifically, UCAR® 144) in the film-forming polymer blend (which also includes UCAR® 446). The graphs are computer-generated calculations derived from the results of a designed experiment. The graphs provide estimates of the quantities of acicular particles and hard film-forming polymer that should be included in a correction fluid at a particular pigment to binder ratio to provide a targeted writeover time.

The preferred correction fluids have a sufficiently low viscosity that the fluids can be applied with a brush, and, of course, provide good coverage of the underlying marking. The viscosity and covering power of the correction fluids, like the writeover time, depend in significant part on the components (and on the quantity of the components) used in the film-forming system.

Figure 4:
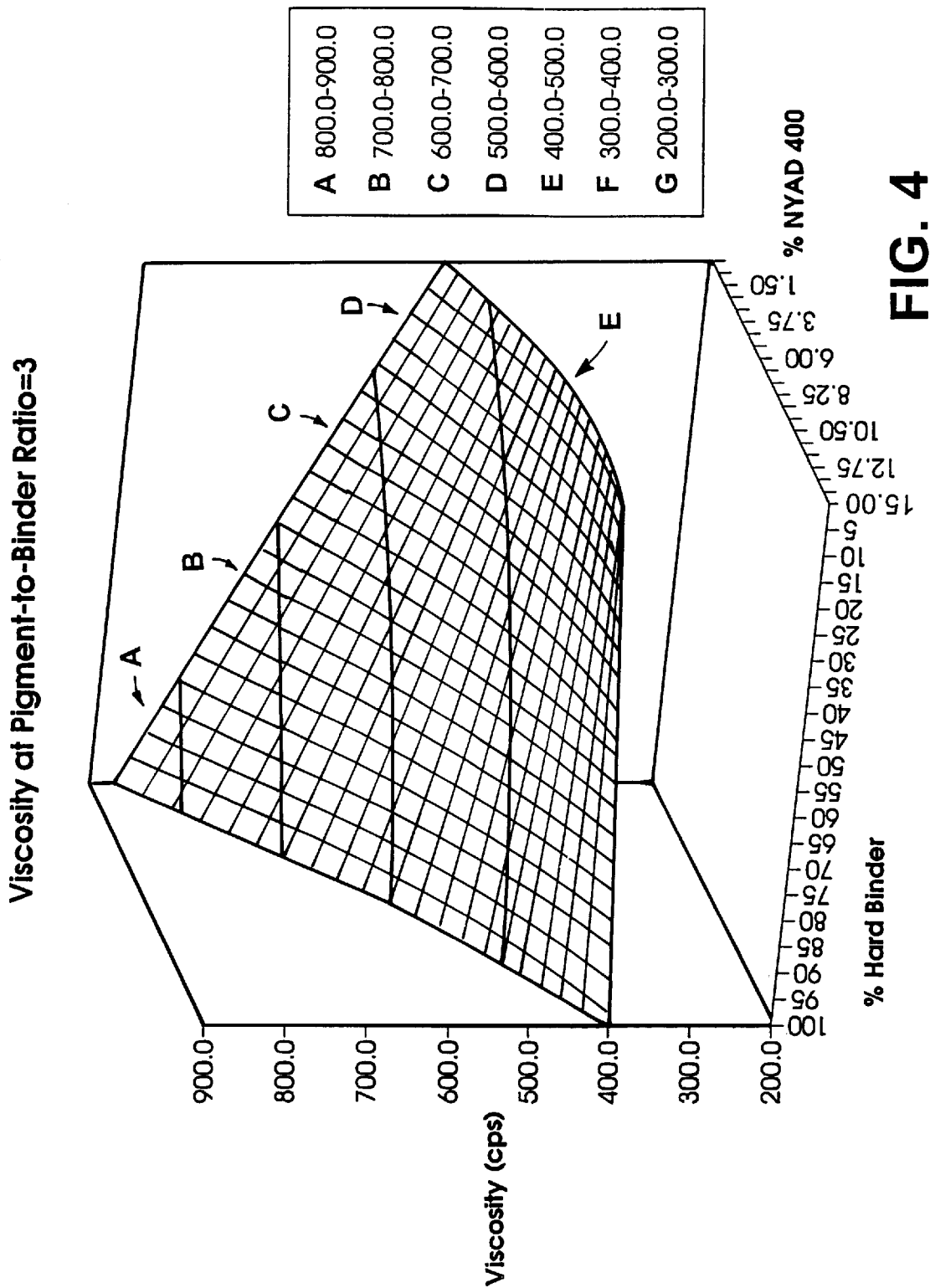
FIGS. 4–6 are graphs which provide predicted viscosities of aqueous correction fluids at specific pigment:film-forming polymer ratios at varied acicular particle and hard film-forming polymer concentrations.
Figure 5:
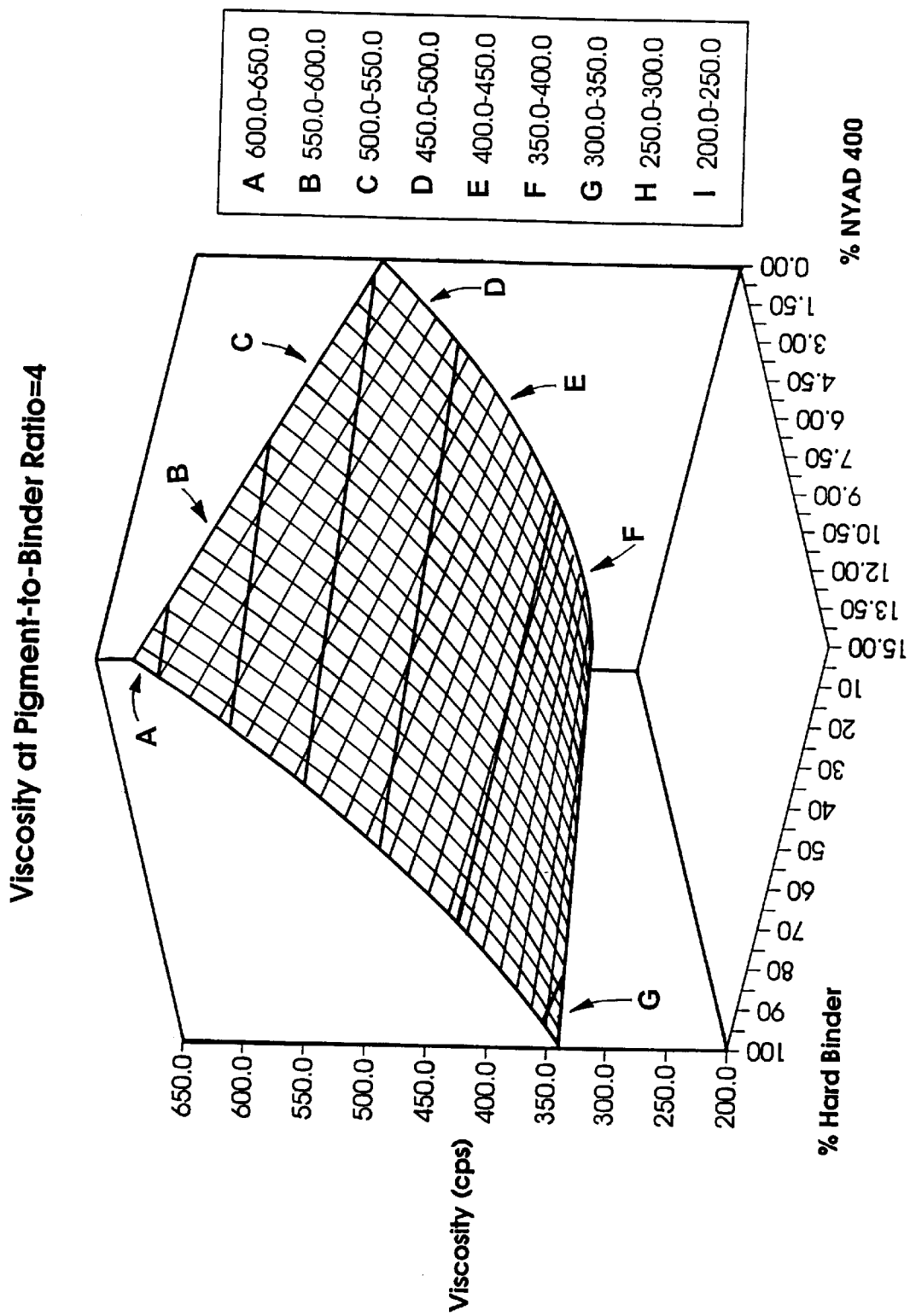
Figure 6:
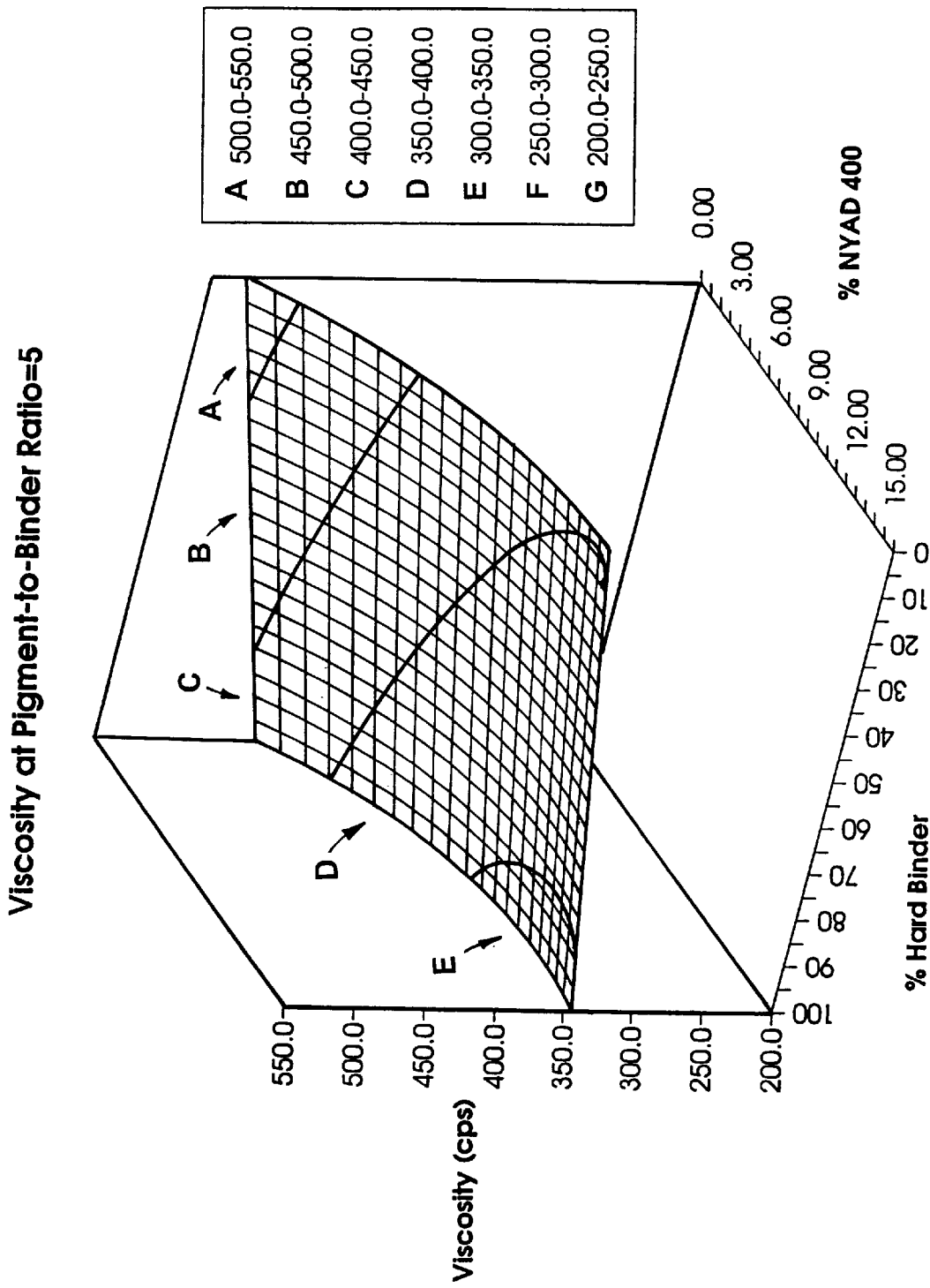

Referring to FIGS. 4–6, the predicted viscosities of aqueous correction fluids at specific pigment:film-forming polymer ratios are plotted on a three dimensional graph against the percent acicular particles (NYAD 400) in the pigment and the percent hard film-forming polymer (UCAR® 144) in the film-forming polymer blend (which also includes UCARC® 446). The graphs are generated in the same general manner as with FIGS. 1–3. They provide estimates of the quantities of acicular particles and hard film-forming polymer that should be included in correction fluid at a particular pigment:binder ratio to provide a targeted viscosity.

Figure 7:
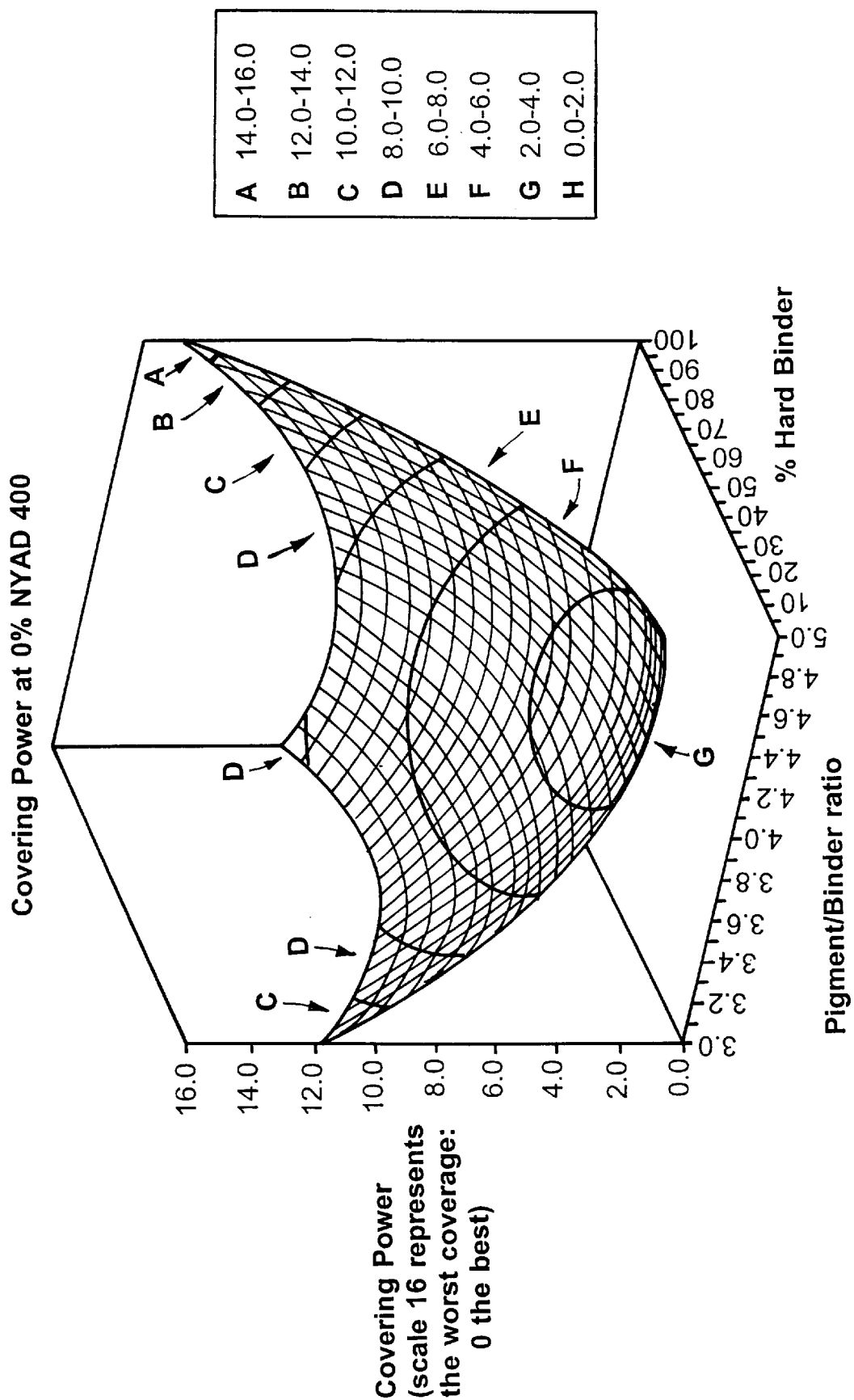
FIGS. 7–9 are graphs which provide predicted covering power of aqueous correction fluids at specific acicular particle concentrations at varied pigment:film-forming polymer ratios and hard film-forming polymer concentrations.
Figure 8:
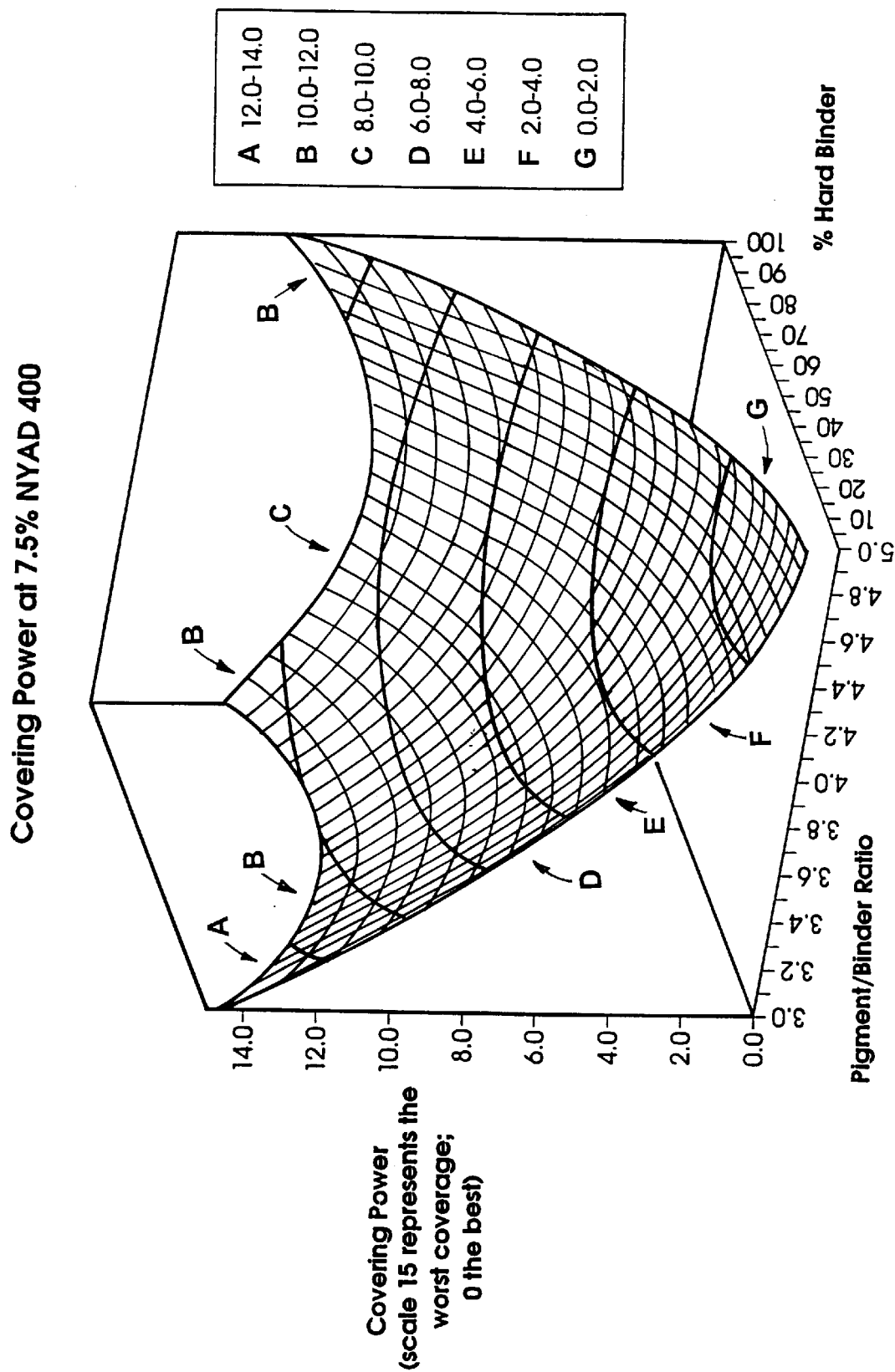
Figure 9:
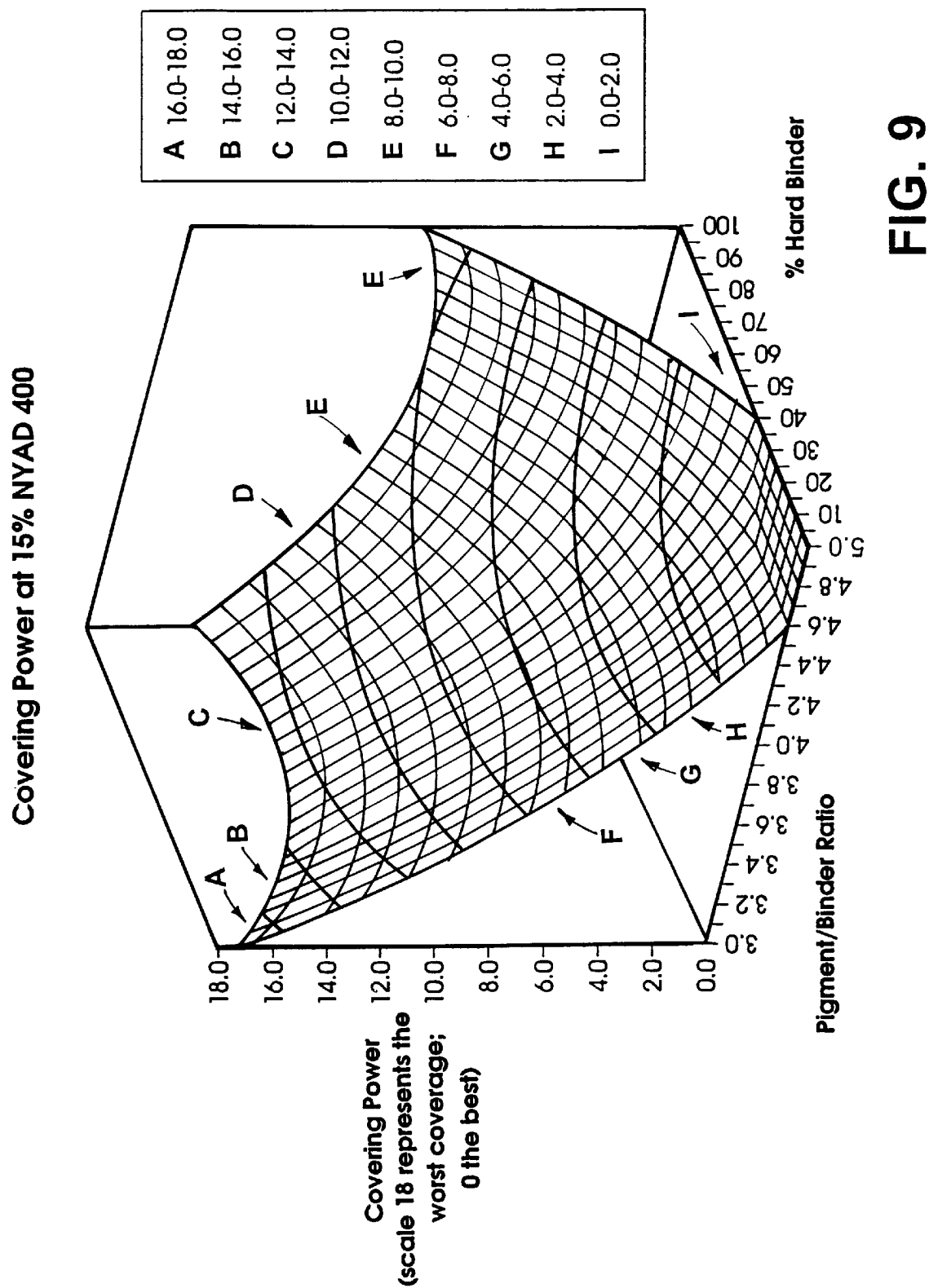

Referring to FIGS. 7–9, the predicted covering power at three fixed acicular particle (NYAD 400) levels (percent of total pigment) is plotted on a three-dimensional graph against the percent hard film-forming polymer (UCAR® 144) in the film-forming polymer blend (which also includes UCAR® 446) and pigment:film-forming polymer ratios. The graphs were generated in the same general manner as FIGS. 1–6. They provide estimates of the pigment:binder ratio and quantity of hard film-forming polymer that should be contained in a correction fluid at a particular acicular particle concentration in order to provide a targeted coverage.

The following specific examples further illustrate the invention. Writeover times for Examples 1–3 were determined using Writeover Test No. 1.

| | Examples 1–3 | | |
|---|---|---|---|
| | | Quantity (weight) | |
| Ingredient | Example 1 | Example 2 | Example 3 |
| Water | 16.90 | 15.57 | 13.05 |
| Nopcosperse 44 | 1.10 | 1.07 | 1.05 |
| UCAR ® Latex 144 | 16.60 | 14.64 | 18.19 |
| UCAR ® Latex 446 | 5.50 | 11.34 | 14.08 |
| Ti-Pure R-900 | 51.20 | 47.48 | 48.45 |
| NYAD 400 | 5.70 | 3.75 | 3.93 |
| Kaopaque 10S | 0.00 | 5.00 | 0.00 |
| Bayferrox Yellow 960/4 | 0.00 | 0.00 | 0.03 |
| Bayferrox 318M | 0.00 | 0.00 | 0.10 |
| Calcotone Blue | 0.01 | 0.00 | 0.00 |
| Magnet Black | 0.10 | 0.12 | 0.00 |
| Surfynol 104 PA | 1.80 | 0.00 | 0.00 |
| Surfynol 104 W* | 0.00 | 0.00 | 0.52 |
| Rhoplex PR-26 | 0.90 | 0.81 | 0.43 |
| Nopco 8034 | 0.30 | 0.21 | 0.16 |
| Pigment: Film-Forming Polymer | 5/1 | 4/1 | 3/1 |
| Total solids | 70% | 71% | 71% |
| Writeover time | 25 sec | 18 sec | 13 sec |
| Viscosity | 370 cps | 528 cps | 530 cps |

*"Home-made" stock solution containing 86% Surfynol 104 and 14% water, all by weight.

Examples 1–3 were prepared by the following procedure:
1. Prepare a 86% (by weight) stock solution of Surfynol 104 in water. The solution is make ready by gradually adding 86 g Surfynol 104 to 14 g water over a period of four to eight hours.
2. Weigh the specified amount of deionized water to a clean mixing container.
3. Weigh the specified amount of Nopcosperse 44 (dispersant).
4. Attach the glass jar containing the water and Nopcosperse 44 with a Cowles type mixing blade and turn on the mixer and run for 3 minutes at 500 rpm to get the water and dispersant mixed.
5. Slowly add the specified amount of NYAD 400 at 500 rpm.
6. Increase mixing speed to 700 rpm and slowly add the specified amount of titanium dioxide, Ti-Pure R900, at a rate that allows complete dispersion of the pigment. Gradually increase mixing speed to 1000, 1400, 2100 rpm to maintain vortex.
7. Slowly add the specified amount of Bayferrox 960/4 and Bayferrox 318M.

8. Allow the whole thing to be mixed for 20 minutes (check mixing speed and make sure vortex is maintained).
9. Slowly add (dropwise) Surfynol 104 (ca. 90% solution in water) at mixing speed of around 1400 rpm.
10. Mix for 10 minutes.
11. Premix the specified amount of UCAR 144 with ¼ of the specified amount of Nopco 8034.
12. Reduce mixing speed to 700 rpm and slowly add the mixture of UCAR 144 and Nopco 8034. Stir for 5 minutes.
13. Premix the specified amount of UCAR 446 with ¼ of the specified amount of Nopco 8034.
14. Slowly add the mixture of UCAR 446 and Nopco 8034. Stir for 10 minutes at 700 rpm.
15. Increase the mixing speed to around 1400 rpm and slowly add (dropwise) the specified amount of Rhoplex PR-26 and stir for 10 minutes.
16. Reduce mixing speed to 700 rpm and slowly add the rest of the specified amount of Nopco 8034.
17. Continuously mix for 5–10 minutes.

| Example 4 | |
| --- | --- |
| Water | 16.28% |
| Dowicil 75 | 0.20% |
| Nopcosperse 44 | 0.97% |
| Ti-Pure R-902 | 47.61% |
| Kaopaque 105 | 5.29% |
| Nyad 400 | 1.06% |
| Mars Black | 0.24% |
| Burnt Umber | 0.11% |
| Ucar Latex 446 | 11.76% |
| Ucar Latex 144 | 15.19% |
| Surfynol 104 (Solid) | 0.27% |
| Rhoplex PR-26 | 0.81% |
| Nopco 8034 | 0.21% |
| Pigment:film-forming polymer | 3.70 |
| Viscosity | 360 |
| pH | 7.92 |
| Dry time | approx. 25 sec. |
| Contrast ratio | 0.99 |

Example 4 was prepared according to the following procedure:
1. Add water to mixing vessel and place under mixer equipped with Cowles type mixing blade.
2. Turn on mixer and set speed low.
3. Add preservative (e.g., Dowicil 75) and mix for 5 minutes or until fully dissolved.
4. Add pigment dispersing agent, Nopcosperse 44, and mix for 5 minutes.
5. Slowly add titanium pigment, TiPure R-902, to the batch increasing mixing speed as necessary to avoid agglomeration.
6. Slowly add kaolin clay pigment, Kaopague 10-S, to the batch increasing mixing speed if necessary to avoid agglomeration.
7. Slowly add functional acicular pigment, Nyad 400, to the batch increasing mixing speed as necessary to avoid agglomeration.
8. Mix batch for 15 minutes.
9. Add Mars Black colorant.
10. Add Burnt Umber colorant.
11. Mix colors for 5 minutes.
12. Add Binder A, Ucar Latex 446.
13. Add Binder B, Ucar Latex 144.
14. Mix batch for 10 minutes.
15. Slowly add substrate wetting agent, Surfynol 104. Surfynol 104 is a solid at room temperature and must be heated to at least 55° C. and maintained at that temperature prior to addition.
16. Slowly add ink bleed inhibitor, Rhoplex PR-26, directly into vortex.
17. Add defoaming agent, Nopco 8034.
18. Mix completed batch mixture for 30 minutes at medium to low speed.

| Examples 5–6 | | |
| --- | --- | --- |
| | % Weight | |
| Ingredient | Example 5 | Example 6 |
| Water (city) | 18.27% | 16.22% |
| Nopcosperse 44 | 0.94% | 0.98% |
| Ti-Pure R-902 | 45.68% | 47.75% |
| Kaopaque 10S | 5.08% | 5.31% |
| Nyad-400 | 3.41% | 1.06% |
| Mars Black | 0.23% | 0.24% |
| Burnt Umber | 0.11% | 0.11% |
| Ucar Latex 446 | 11.81% | 11.80% |
| Ucar Latex 144 | 15.25% | 15.24% |
| Surfynol 104 (solid) | 0.26% | 0.28% |
| Rhoplex PR-26 | 0.78% | 0.82% |
| Nopco 8034 | 0.20% | 0.21% |
| Pigment: Film-Forming Polymer | 3.7:1 | 3.7:1 |
| Total solids | 70% | 70% |
| Writeover time | <25 sec. | <25 sec. |
| Viscosity | 360 | 360 |

These examples were prepared by procedure analogous to the procedures used to prepare example 4.

| Examples 7–8 | | |
| --- | --- | --- |
| | % Weight | |
| Ingredient | Example 7 | Example 8 |
| Water | 13.32% | 14.82% |
| Nopcosperse 44 | 1.28% | 1.13% |
| $TiO_2$ R-900 | 46.53% | 47.91% |
| Kaopaque 10 S | 3.88% | 3.99% |
| Nyad 400 | 1.29% | 1.33% |
| Mars Black | 0.23% | 0.24% |
| Burnt Umber | 0.11% | 0.11% |
| UCAR Latex 446 | 13.70% | 12.09% |
| UCAR Latex 144 | 18.20% | 16.06% |
| Surfynol 104 | 0.25% | 0.62% |
| Rhoplex PR 26 | 1.00% | 1.50% |
| Nopco 8034 | 0.21% | 0.21% |
| Pigment:Film-Forming polymer | 3:1 | 3.5:1 |
| Total solids | 70.16% | 70.14% |
| Writeover time | 30 sec. | 30 sec. |
| Viscosity | 590 cps | 590 cps |

These examples were prepared by procedures analogous to procedures used to prepare example 4.

Example 9

| Ingredient | % TS* Ingr. | Amt Ingr. | TS Ingr. | % |
|---|---|---|---|---|
| Water (city) | 0.00 | 16.28 | 0.00 | 16.30% |
| Dowicil 75 | 1.00 | 0.20 | 0.20 | 0.20% |
| Nopcosperse 44 | 0.35 | 0.97 | 0.34 | 0.98% |
| Ti-Pure R-902 | 1.00 | 47.61 | 47.61 | 47.65% |
| Kaopaque 10S | 1.00 | 5.29 | 5.29 | 5.30% |
| Nyad-400 | 1.00 | 1.06 | 1.06 | 1.06% |
| Mars Black | 0.50 | 0.24 | 0.12 | 0.24% |
| Ucar Latex 446 | 0.62 | 11.76 | 7.29 | 11.78% |
| Ucar Latex 144 | 0.48 | 15.19 | 7.29 | 15.21% |
| Surfynol 104 (solid) | 1.00 | 0.27 | 0.27 | 0.27% |
| Rhoplex PR - 26 | 0.31 | 0.81 | 0.25 | 0.81% |
| Nopco 8034 | 1.00 | 0.21 | 0.21 | 0.21% |
| Total | | 99.90 | 69.93 | 100.00% |

Pigment Binder Ratio = 3.70
Total Solids = 70.00%
*TS = total solids

Example 9 was prepared by the following procedure.
1. Add water to mixing vessel and place under mixer equipped with Cowles type mixing blade.
2. Turn on mixer and set speed low.
3. Add preservative, Dowicil 75, and mix for 5 minutes or until fully dissolved.
4. Add pigment dispersing agent, Nopcosperse 44, and mix for 5 minutes.
5. Slowly add the titanium pigment, TiPure R-902, to the batch necessary to avoid agglomeration.
6. Slowly add kaolin clay pigment, Kaopaque 10-S, to the batch increasing mixing speed if necessary to avoid agglomeration.
7. Slowly add functional acicular pigment, Nyad 400, to the batch increasing mixing speed as necessary to avoid agglomeration.
8. Mix batch for 15 minutes.
9. Add Mars Black colorant.
10. Mix for 5 minutes.
11. Add Binder A, Ucar Latex 446.
12. Add Binder B, Ucar Latex 144.
13. Mix batch for 10 minutes.
14. Slowly add substrate wetting agent, Surfynol 104. NOTE: Surfynol 104 is a solid at room temperature and must be heated to at least 55° C. and maintained at that temperature prior to addition.
15. Slowly add ink bleed inhibitor, Rhoplex PR-26, directly to vortex.
16. Add defoaming agent, Nopco 8034.
17. Mix completed batch mixture for 30 minutes at medium to low speed.

Example 10

| Ingredient | % TS Ingr. | Amt Ingr. | TS Ingr. | % |
|---|---|---|---|---|
| Water (city) | 0.00 | 23.95 | 0.00 | 22.24% |
| Dowicil 75 | 1.00 | 0.20 | 0.20 | 0.19% |
| Nopcosperse 44 | 0.35 | 0.97 | 0.34 | 0.91% |
| Ti-Pure R-902 | 1.00 | 47.61 | 47.61 | 44.21% |
| Kaopaque 10S | 1.00 | 5.29 | 5.29 | 4.91% |
| Nyad-400 | 1.00 | 1.06 | 1.06 | 0.98% |
| Mars Black | 0.50 | 0.24 | 0.12 | 0.22% |
| Burnt Umber | 0.55 | 0.11 | 0.06 | 0.11% |
| Ucar Latex 446 | 0.62 | 11.76 | 7.29 | 10.92% |
| Ucar Latex 144 | 0.48 | 15.19 | 7.29 | 14.11% |
| Surfynol 104 (solid) | 1.00 | 0.27 | 0.27 | 0.25% |
| Rhoplex PR - 26 | 0.31 | 0.81 | 0.25 | 0.76% |
| Nopco 8034 | 1.00 | 0.21 | 0.21 | 0.19% |
| Total | | 107.68 | 70.00 | 100.00% |

Pigment Binder Ratio = 3.70
Total Solids = 65.00%

Example 10 was prepared by a procedure analogous to the procedure used to prepare Example 4.

The preferred correction fluids can be used in conventional bottle and brush application, as well as other known correction fluid applications.

Writeover time may also be determined in accordance with a second test, which will be referred to in this application as "Writeover Test No. 2." Writeover Test No. 2 is:

1. Writeover Test No. 2 is performed at room temperature and at a relative humidity level of between 30% to 45%.
2. A vacuum table supplied from Paul N. Gardner Company, Inc. of Pompano, Fla. having a flat surface with approximately 0.1 inch diameter holes spaced at 1 inch intervals. The table is connected to a vacuum source. The vacuum table is wiped down with a suitable solvent to remove any surface contaminates from the surface.
3. A slight vacuum is then applied to the vacuum table so as to draw air through the holes.
4. A sheet of 8½"×11" paper having a weight of 75 grams per square meter, manufactured by Hammermill Papers is then placed over the entire surface of the vacuum table, so as to cover all of the vacuum holes on the table.
5. A piece of paper is placed on the first piece.
6. The amount of vacuum drawn through the holes on the vacuum table is thereafter adjusted so as to be strong enough to "just hold" the paper on the table.
7. A constant wet film of the correction fluid to be tested is thereafter applied to the paper. Application of the wet film takes approximately 4 seconds, and immediately after application a "birdbar" applicator is drawn down over the thick fluid so as to form a layer of correction fluid having a constant thickness of two ml. The drawn down rate used should be 5 inches per second.
8. The vacuum is turned off immediately after the birdbar has been drawn over the paper.
9. As soon as the vacuum is turned off, the tester attempts to write a word over the applied fluid at every five second interval using a Papermate medium ball point pen. This pen has a 300 gram weight attached to the non-writing end. The tester examines the word markings. The writeover time is the time from when the correction fluid is first drawn down on the paper using of the birdbar, to the time wherein the markings made by the pen are essentially free of voids. By free of voids, it means that the written trace left by the pen is continuous, and does not skip, or become submerged in wet fluid.

10. The test should be repeated at least 5 times to determine the writeover time of a particular correction fluid.

The writeover time of Example 1 was measured using Writeover Test No. 2, and found to be approximately 25 seconds.

Other embodiments are within the claims. For example, the correction fluid can include an ingredient like urea that improves its freeze thaw characteristics. This ingredient allows the correction fluid to maintain its fluidity (with moderate shaking) and overall performance even when the correction fluid is stored at 5° F. for 1–3 days. The correction fluid can include, for example, 0.5% to 5%, more preferably 1% to 3%, and most preferably 1.5% to 2.5%, of the ingredient by weight. Example 11, which was prepared by a procedure analogous to those used to prepare the other examples, includes urea.

| Ingredients | Wt. % |
| --- | --- |
| Water | 13.396 |
| Glydant Plus | 0.182 |
| Urea | 2.020 |
| Nopcosperse 44 | 0.989 |
| Ti-Pure R-902 | 48.072 |
| Kaopaque 10-S | 5.340 |
| Nyad 400 | 1.069 |
| Mars Black | 0.242 |
| Burnt Umber | 0.111 |
| Ucar Latex 446 | 11.882 |
| Ucar Latex 144 | 15.334 |
| Surfynol 104 (solid) | 0.333 |
| Rhoplex PR-26 | 0.818 |
| Nopco 8034 | 0.212 |
|  | 100.000 |

Example 11 was prepared according to the following procedure:

1. Add water to mixing vessel and place under mixer equipped with cowles type mixing blade.
2. Turn on mixer and set speed low.
3. Add preservative (Glydant Plus) and mix for 5 minutes or until fully dissolved.
4. Add urea and mix for 5 minutes or until fully dissolved.
5. Add pigment dispersing agent, Nopcosperse 44, and mix for 5 minutes.
6. Slowly add titanium pigment, TiPure R-902, to the batch increasing mixing speed as necessary to avoid agglomeration.
7. Slowly add kaolin clay pigment, Kaopaque 10-5, to the batch increasing mixing speed if necessary to avoid agglomeration.
8. Slowly add functional acicular pigment, Nyad 400, to the batch increasing mixing speed as necessary to avoid agglomeration.
9. Mix batch for 15 minutes.
10. Add Mars Black colorant.
11. Add Burnt Umber colorant.
12. Mix colors for 5 minutes.
13. Add Binder A, Ucar Latex 446.
14. Add Binder B, Ucar Latex 144.
15. Mix batch for 10 minutes.
16. Slowly add substrate wetting agent, Surfynol 104. Surfynol 104 is a solid at room temperature and must be heated to at least 55° C. and maintained at that temperature prior to addition.
17. Slowly add ink bleed inhibitor, Rhoplex PR-26, directly into vortex.
18. Add defoaming agent, Nopco 8034.
19. Mix completed batch mixture for 30 minutes at medium to-low speed.

We claim:

1. A water-based correction fluid comprising an opacifying pigment, a film-forming polymer, acicular particles, and water.

2. The water-based correction fluid of claim 1, wherein said opacifying pigment comprises titanium dioxide.

3. The water-based correction fluid of claim 1, wherein said acicular particles comprise calcium metasilicate.

4. The water-based correction fluid of claim 1, wherein said acicular particles have an aspect ratio of between about 5:1 and about 10:1.

5. The water-based correction fluid of claim 1, wherein said correction fluid includes between about 1% and about 9% of said acicular particles by weight.

6. The water-based correction fluid of claim 1, wherein said correction fluid includes between about 45% and about 60% of said opacifying pigment by weight, between about 6% and about 17% of said film-forming polymer by weight, between about 1% and 9% of said acicular particles by weight, and between about 20% and 40% of said water by weight.

7. The water-based correction fluid of claim 1, wherein said film-forming polymer has a glass transition temperature of less than about 17° C.

8. The water-based correction fluid of claim 1, wherein said film-forming polymer has a glass transition temperature of between about 10° C. and about 30° C.

9. The water-based correction fluid of claim 8, wherein said correction fluid further comprises a second film-forming polymer having a glass transition temperature of less than about 17° C.

10. The water-based correction fluid of claim 9, wherein said correction fluid has a pigment:film-forming polymer weight ratio of between about 5:1 and about 3:1.

11. The water-based correction fluid of claim 9 wherein said second film-forming polymer has a glass transition temperature of less than about 12° C.

12. The water-based correction fluid of claim 11 wherein the ratio of said film-forming polymer having a glass transition temperature of between about 10° C. and about 30° C. to said second film-forming polymer is between about 70:30 and about 20:80.

13. The water-based correction fluid of claim 1, wherein said correction fluid has a pigment:film-forming polymer weight ratio of between about 5:1 and about 3:1.

14. A method for providing a corrective coating on the surface of a paper substrate, said method comprising
    providing a correction fluid comprising an opacifying pigment, a film-forming polymer, acicular particles, and water, and
    applying said correction fluid to a marking on the surface of a paper substrate to provide a corrective coating that covers said marking.

15. The method of claim 14 wherein said correction fluid comprises two film-forming polymers having different glass transition temperatures.

16. The method of claim 15 wherein a first of said film-forming polymers has a glass transition temperature of between about 10° C. and about 30° C. and a second of said film-forming polymers has a glass transition temperature of less than about 17° C.

17. The method of claim 14 wherein said correction fluid has a pigment:film-forming polymer weight ratio of between about 5:1 and about 3:1.

18. The method of claim 14 wherein said acicular particles comprise calcium metasilicate.

19. The method of claim 14 wherein said acicular particles have an aspect ratio of between about 5:1 and about 10:1.

20. The method of claim 14 wherein said correction fluid includes between about 1% and about 9% of said acicular particles by weight.

* * * * *